INVENTORS
JOHN G. KAY + ALFRED L. OSINSKI

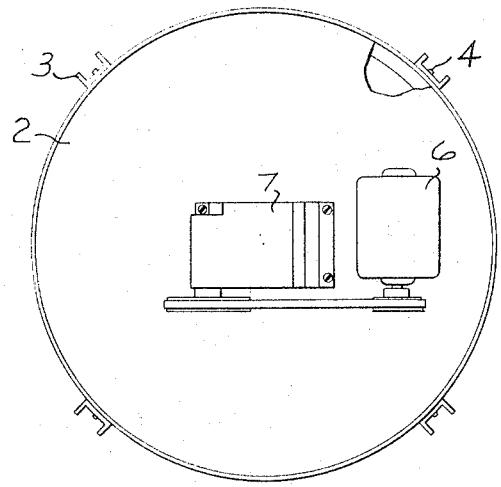
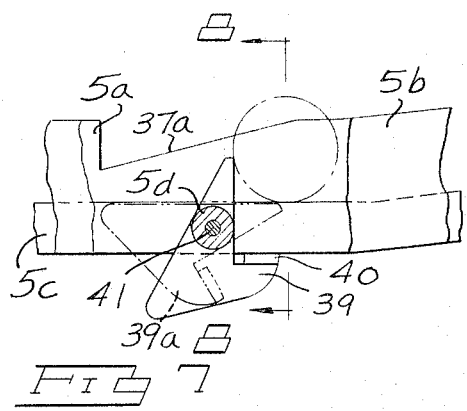
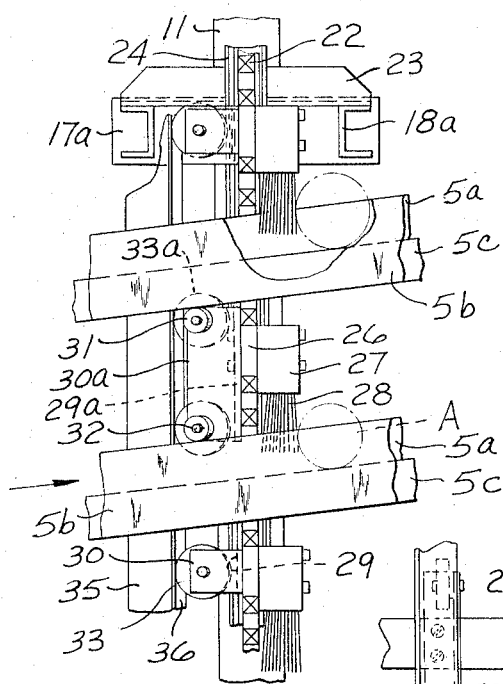
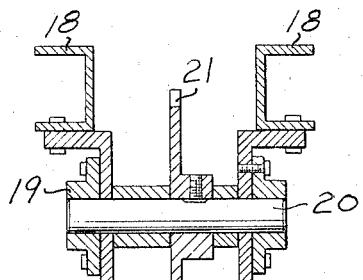
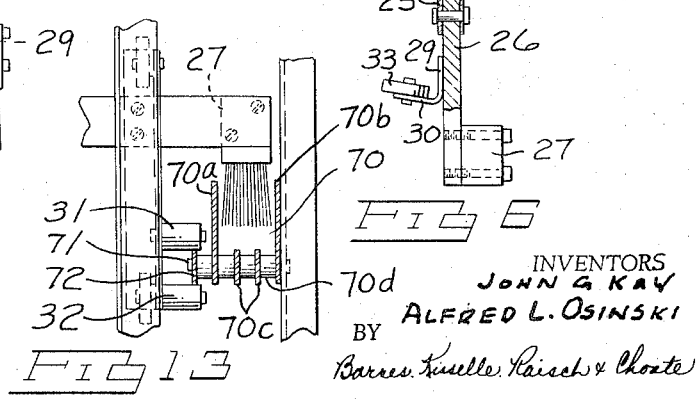

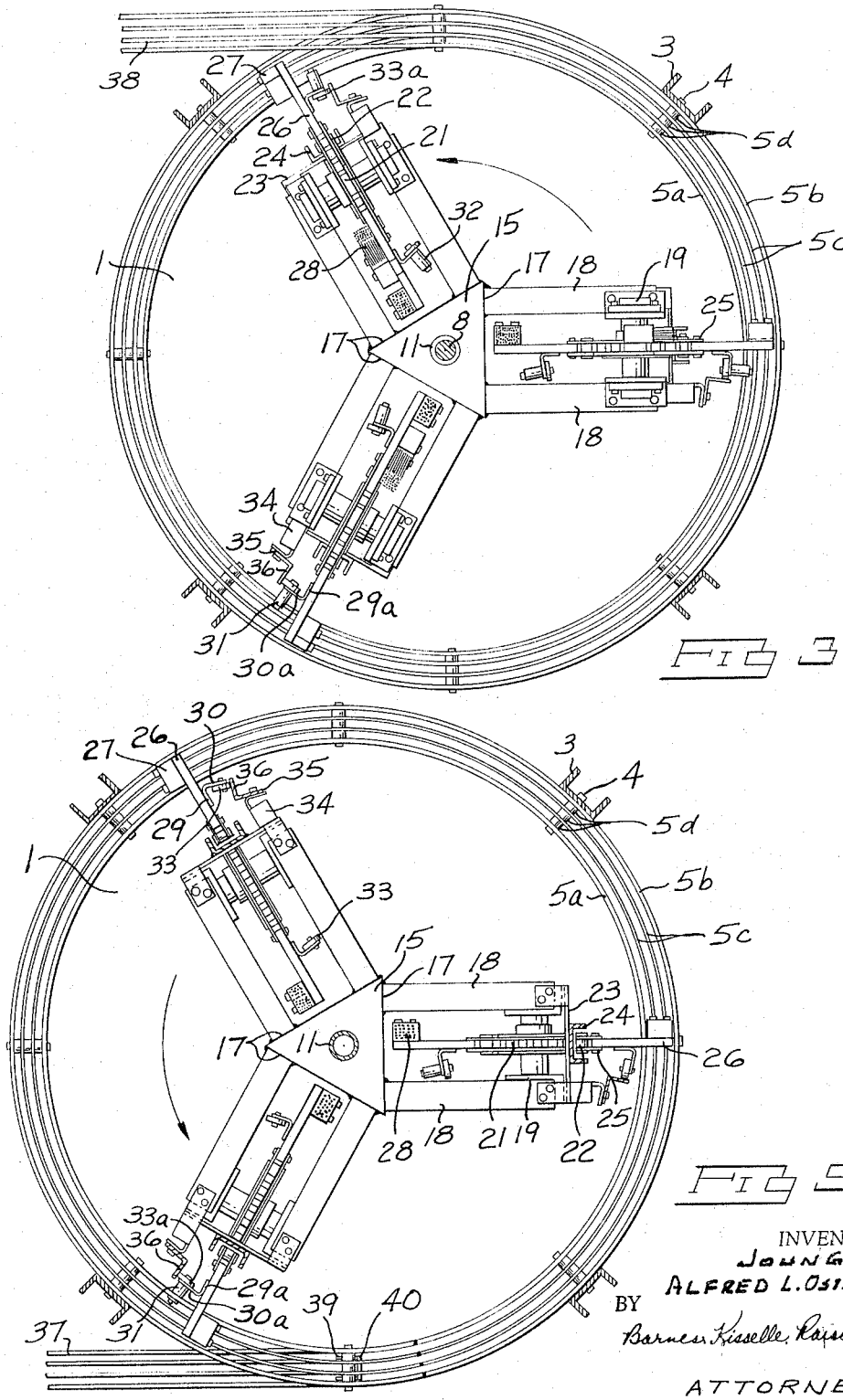

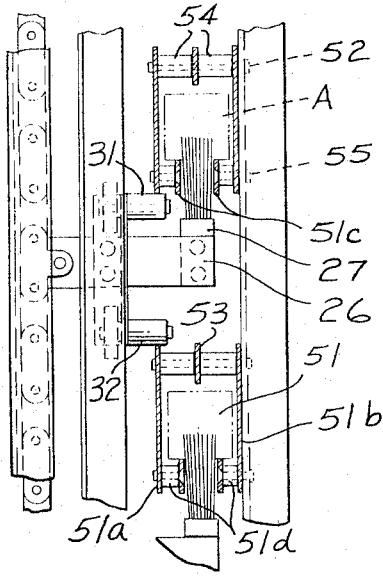
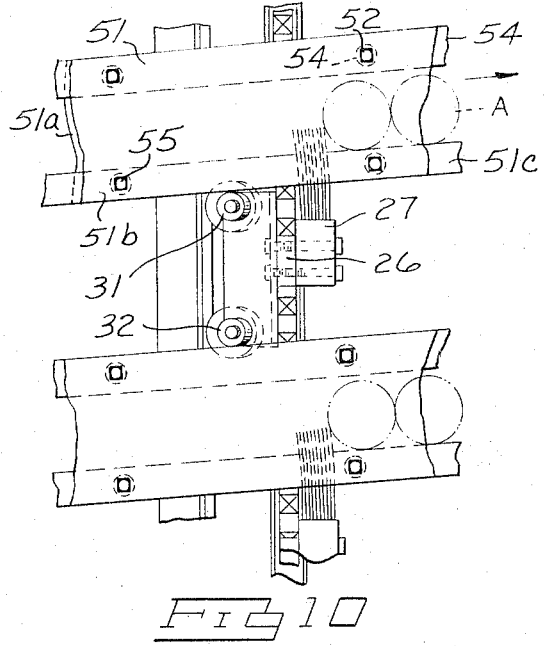
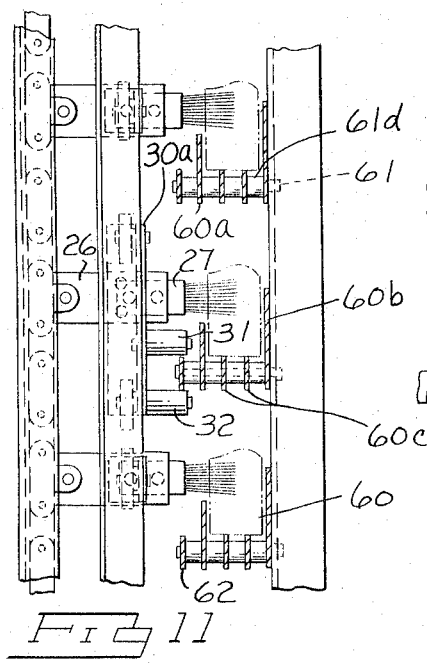
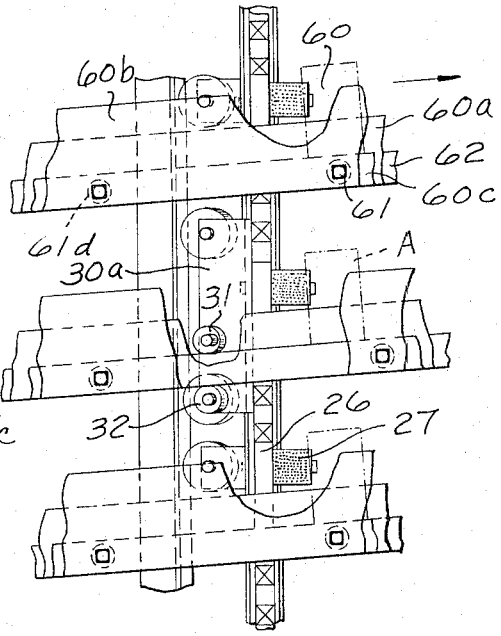

United States Patent Office 3,295,666
Patented Jan. 3, 1967

3,295,666
HELICAL STORAGE UNIT
John G. Kay, Detroit, and Alfred L. Osinski, Warren, Mich., assignors to F. Jos. Lamb Company, Inc., Detroit, Mich., a corporation of Michigan
Filed Oct. 21, 1965, Ser. No. 499,174
17 Claims. (Cl. 198—212)

This invention relates to improvents in helical storage units. It is an object of the invention to provide such a storage unit wherein the power required for its operation is reduced to a minimum by providing resilient propelling members which are confined substantially exclusively to engaging workpieces and urging them along a helical runway without having any material contact with the latter so that the members are not subjected to unnecessary wear; and only when the runway is full and discharge of workpieces therefrom is prevented by a gate or other positive stop, or too many workpieces have accumulated in front of a single resilient propelling member for the latter to advance them all at one time, are the said members deflected to pass the workpieces or at least some of them.

Another object of the invention is to provide such a storage unit wherein the arrangement may be such that the propelling members engage the workpieces from above, from the side, or from beneath. In the latter case, the propelling members tend to raise the workpieces off the runway along which they are to be moved and particularly when the undersides of the workpieces are flat as in the case of some pistons, this lifting tendency reduces the power required to move them along the runway.

Another object of the invention is to provide a helical storage unit having a vertical spindle mounted for rotation and a stationary helical runway arranged coaxially around it, at least one vertically spaced pair of sprockets carried by the spindle for rotation about the axis thereof, the sprockets having an endless chain extending around them from which a plurality of spaced resilient propelling members project to urge workpieces along the runway, and means for moving the chain vertically a distance equal to the pitch of the runway during each revolution of the spindle. If only a relatively small number of workpieces are to be advanced per minute around the runway, one pair of vertically spaced sprockets having an endless chain around them will usually advance a sufficient number of workpieces around the runway but if a more continuous flow, as for distribution to a number of machines, is required a plurality of pairs of sprockets having an endless chain around each pair are utilized with resilient propelling members projecting from each chain.

A further object of the invention is to provide such a helical storage unit wherein means projecting from the chain or chains engage the runway and impart continuous vertical movement to the chain, or chains, equal to the pitch of the runway during each revolution of the spindle.

With these and other objects and advantages in view, which will become apparent as the specification proceeds, the invention is now more fully described with the aid of the accompanying drawings in which:

FIG. 2 is a reduced plan view thereof.

FIG. 3 is a section on the line 3—3 of FIG. 1.

FIG. 4 is an enlarged fragmentary view taken on the line 4—4 of FIG. 1.

FIG. 5 is a section on the line 5—5 of FIG. 1.

FIG. 6 is an enlarged fragmentary sectional view on the line 6—6 of FIG. 1.

FIG. 7 is an enlarged fragmentary view showing the junction of the feed chute with the bottom of the helical runway.

FIG. 8 is a section on the line 8—8 of FIG. 7.

FIGS. 9 and 10 show enlarged fragmentary side and front views, respectively, of a slightly modified arrangement of the runway, the resilient propelling members, and the means for maintaining the latter correctly vertically positioned relative to the portions of the runway along which the said members are adapted to urge the workpieces.

FIGS. 11 and 12 show enlarged fragmentary side and front views, respectively, of another slightly modified arrangement of the runway, the resilient propelling members, and the means for maintaining the latter correctly vertically positioned relative to the portions of the runway along which the said members are adapted to urge workpieces.

FIG. 13 is an enlarged fragmentary view showing a slight modification of FIG. 1.

Figure 1:
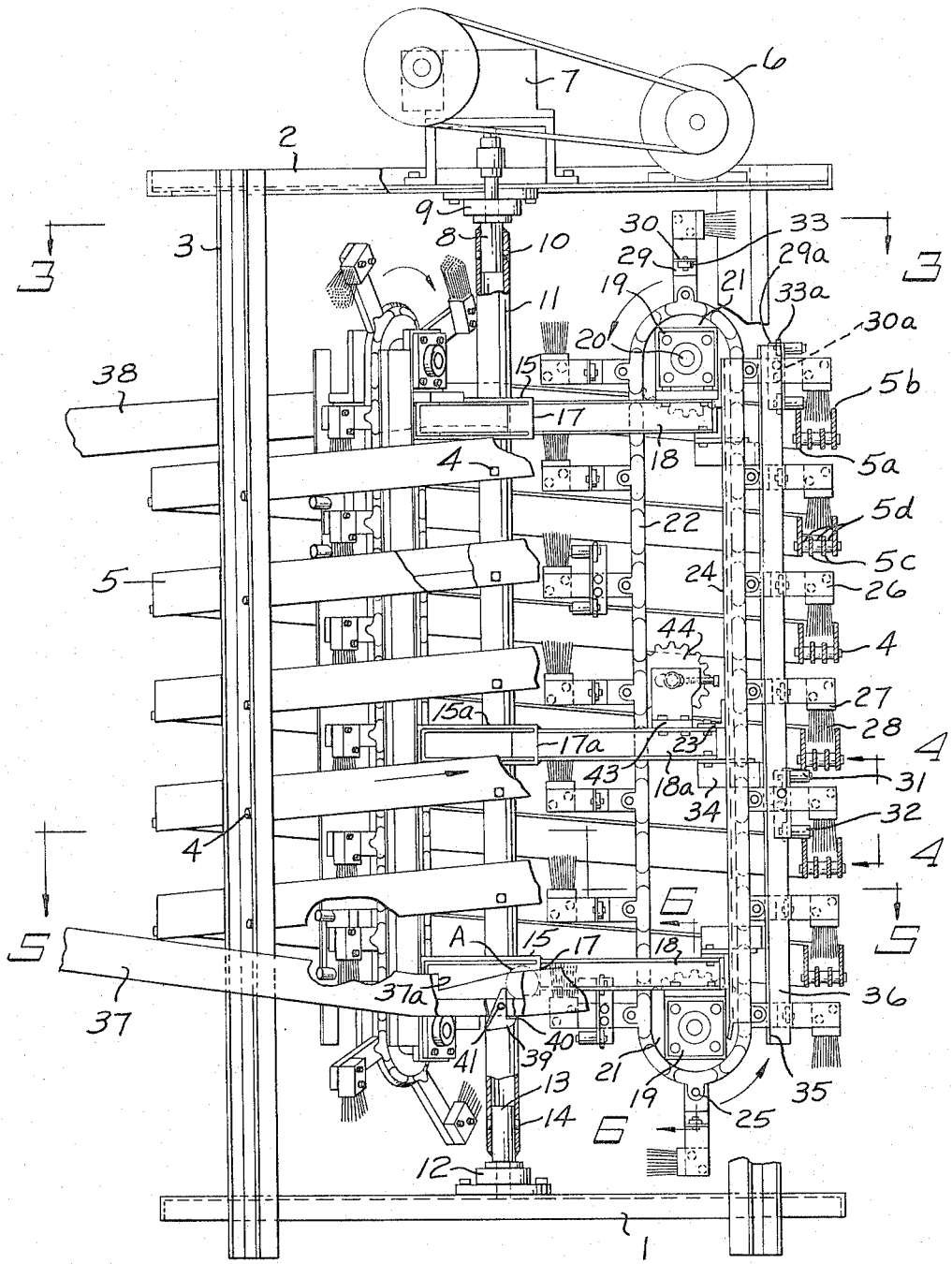
FIG. 1 is a side view, partly in section, of a helical storage unit embodying the invention.

Referring first to FIGS. 1 to 8, the frame of the storage unit includes a circular baseplate 1 coaxially above which a cap 2 is held by a plurality of circumferentially spaced upright supports 3 which are welded or otherwise suitably secured thereto. The supports are also attached to the periphery of baseplate 1 and project downwardly beneath it for mounting in the floor (not shown). Secured as by bolts 4 to the inner faces of the supports 3 and extending throughout the major portion of the vertical distance between the baseplate and the cap is a helical runway 5 upwardly around which workpieces are adapted to be advanced in a manner hereinafter described. In the present instance the runway consists of inner and outer helically wound guide rails 5a and 5b, respectively, between which correspondingly wound carrier rails 5c of lesser height are provided. All the rails 5a, 5b and 5c are laterally spaced from one another throughout their length by spacers 5d. Bolts 4 extend through spacers 5d and all the rails. Mounted on the cap 2 is a suitable driving unit including a motor 6 and a speed reducer 7 driven thereby. The output shaft 8 of the speed reducer extends downwardly coaxially through the cap 2 and is mounted for rotation in a bearing 9 provided therein. Secured as by puddle welds 10 around the lower extremity of the shaft 8 is the upper extremity of a tubular spindle 11. Mounted coaxially on the baseplate 1 is a suitable bearing 12 which supports a stub shaft 13 for rotation, and around the upper extremity of the stub shaft the lower extremity of the tubular spindle 11 is secured as by other puddle welds 14.

Welded or otherwise secured at vertically spaced intervals around the spindle 11 for rotation therewith are upper and lower mountings 15 and an intermediate mounting 15a, the peripheral faces 17 and 17a, respectively, of which are shown multi-sided and of equilateral-triangular form. These mountings 15 and 15a are relatively so arranged that each peripheral face of one mounting is in vertical alignment with one peripheral face of each of the other mountings. The upper mounting 15 is located somewhat beneath the upper extremity of the helical runway 5, the lower mounting is somewhat above the lower extremity thereof.

Welded or otherwise secured to each peripheral face 17 or 17a and extending substantially radial to the axis of the spindle 11 and parallel to one another is a horizontally opposed pair of outwardly projecting channel-shaped carries 18 or 18a, respectively. Each pair of carriers 18 or 18a is in vertical alignment with one pair of carriers projecting from each of the other mountings. The outer extremities of all the carriers terminate the same distance from the axis of the spindle 11, and mounted at the outer extremities of each horizontally opposed pair of carriers 18 are bearings 19 which support opposite extremities of a shaft 20. On each shaft 20 a sprocket 21 is mounted. All the sprockets are radial to and equidistant from the axis of the spindle 11, and extending around each vertically aligned pair of sprockets is an endless chain 22. Secured to and extending between the top flanges of each opposed pair of channel-shaped carriers 18 and 18a is a strap 23, to which a vertical back-up plate 24 made of channel section is secured. Each back-up plate 24 extends immediately behind the outer flight of one of the chains 22 throughout the major portion of its height to maintain it substantially vertical as it travels upwardly while at the same time the chains and their sprockets 21 are also rotated about the axis of the spindle 11.

Secured to each endless chain 22 by chain attachments 25 spaced from one another a distance equal to the pitch of the helical runway 5 are a plurality of outwardly projecting arms 26. The arms on the outer flights of the chain extend between adjacent turns of the helical runway while those on the inner flights project towards the axis of the spindle 11, and secured to the outer extremities of the arms and projecting at right angles therefrom are resilient propelling members 27. The members 27 extending downwardly from the outer flights are positioned to urge workpieces A upwardly along the runway while those on the inner flights project upwardly and travel freely downward adjacent the spindle 11. The resilient propelling members in this instance consist of brushes provided with resilient bristles 28.

Mounted on most of the arms 26 intermediately of their length are short vertical angle brackets 29 having flanges 30 at their outer extremities projecting rearwardly relative to the direction of rotation of the arms 26 about the axis of the spindle 11. Flanges 30 which project from arms 26 on the outer flights of the chains during their upward travel are at that time somewhat inwardly spaced from and substantially parallel with the adjacent portions of the inner guide rail 5a of the runway. Projecting outwardly from the rear carrier 18, 18a and 18 of each horizontal pair, relative to their direction of rotation about the axis of the spindle 11, are supports 34 to each vertical set of which a continuous vertically extending back-up plate 35 is secured. Each back-up plate 35 includes an outwardly projecting bearing flange 36 extending at right angles to and rearwardly of one of the flanges 30. Mounted on the inner faces of the flanges 30 are rollers 33 which, as the outer flights of the chains are moved upwardly in a manner hereinafter described, travel upwardly in contact with the bearing flanges. These bearing flanges prevent bending or temporary stopping of any of the arms 26 if an accumulation of workpieces is encountered by one of the resilient propelling members 27, as the flexible parts of the latter are merely rearwardly deflected sufficiently for the members to pass the stopped workpieces and continue their upward rotary movement.

Mounted on the remaining arms 26 at uniformly spaced intervals are taller vertical angle brackets 29a having flanges 30a of the same height which project rearwardly from their outer extremities. Projecting outwardly from each flange 30a are rollers 31 and 32 which are vertically spaced from one another. Each roller 31 is adapted to engage and travel around the lower edge of one turn of the inner guide rail 5a of the helical runway and the other roller 32 engages and travels around the upper edge of the turn of the said guide rail immediately beneath. Thus during each revolution of the spindle 11 the rollers 31 and 32 on the outer flights of chains 22 are raised a distance equal to the pitch of the helical runway and thereby move the outer flights of the chains correspondingly upwards. Projecting inwardly from each flange 30a are other rollers 33a each preferably in alignment with one of the rollers 31 or 32. The rollers 33a travel upwardly on the bearing flanges 36 in the same manner as the rollers 33.

Gravity chuting 37 is secured as by welding to the lower extremity of the runway 5 for delivery of workpieces into the latter in a tangential direction. The inner wall of chuting 37 is partly cut away at 37a (FIG. 1) slightly in advance of the junction between chuting 37 and runway 5 to permit entry of the lower rollers 32 and the resilient propelling members 27 into the runway. Projecting from the upper extremity of runway 5 is suitable discharge chuting 38.

Adjacent and extending within the lower extremity of the runway 5 is a pivoted stop 39 shown particularly in FIGS. 7 and 8 to prevent movement of workpieces rearwardly from the lower portion of the helical runway 5 into the chuting 37. This stop is pivotally mounted on a bolt 41 which extends through the guide rails 5a and 5b, the carrier rails 5c and spacers 5d and includes a cross bar 40 which normally extends immediately beneath the carrier rails 5c so that the stop is free to turn about the bolt 41 in a clockwise direction, FIG. 7, as indicated at 39a, to permit workpieces to pass upwardly along the runway 5. However, the cross bar is normally positioned against the undersides of the carrier rails 5c so that it is prevented from turning in the opposite direction.

A conventional slack take-up for each chain 22 may also be provided, one of which is shown in FIG. 1. It consists of a base 43 secured to each pair of the intermediate carriers 18a and has an idler sprocket 44 mounted thereon for radial adjustment relative to the spindle 11 to engage the inner flight of each of the chains intermediately of its length.

In the modification shown in FIGS. 9 and 10 the helical runway 51 again includes inner and outer guide rails 51a and 51b having carrier rails 51c between them along which workpieces are adapted to travel. Each carrier rail 51c is secured throughout its length in uniformly spaced relation to the guide rail nearest to it by a plurality of bolts 55 having spacers 51d thereon, so that a continuous gap is formed between the carrier rails 51c throughout the length of the runway for the passage of the resilient propelling members 27 therealong. In this instance it will be noted that the members 27 project upwardly from the arms 26 which extend beneath the runway. Extending transversely through the guide rails 51a and 51b adjacent their upper extemities are a plurality of bolts 52 each of which support a longitudinal retainer rail 53, and 54 denotes spacers on the bolts 52 for maintaining the rail 53 substantially central between the guide rails.

As before, where employed, the rollers 31 and 32 are supported on some of the arms 26 to engage the lower edge face of one turn of the inner guide rail 51a and the upper edge face of the turn of the said guide rail immediately beneath. The purpose of the retainer rail 53 is to prevent workpieces being thrust any material distance upwardly above the carrier rails along which they are adapted to travel.

In the modification of the helical runway 60 shown in FIGS. 11 and 12, the inner guide rail 60a is of lesser height than the outer guide rail 60b and between the said guide rails are shallower carrier rails 60c. All these rails 60a, 60b and 60c are held in spaced relation to one another by bolts 61 having spacers 61d thereon. The bolts 61 also extend inwardly beyond the inner guide rail towards the axis of the unit and support a helically wound strip 62 which is of uniform height throughout its length. The upper margin of the strip is uniformly inwardly spaced from, parallel with and beneath the upper edge of the said inner guide rail. The rollers 31 and 32 which project outwardly from the flanges 30a mounted on some of the arms 26 travel along the upper and lower margins of strip 62, respectively. The resilient propelling members 27 in this case project horizontally above strip 62 and the inner guide rail to engage workpieces and urge them along the runway.

FIG. 13 shows a slight modification of the arrangement in FIGS. 1 to 8. 72 denotes a helically wound strip of uniform height the upper edge face of which is uniformly inwardly spaced beneath the upper extremity of the inner guide rail 70a. As before bolts 71 spaced from one another project through the inner and outer guide rails 70a, 70b, the carrier rails 70c and through spacers 70d between adjacent rails. Rollers 31 and 32 engage the upper and lower edges, respectively, of strip 72.

We claim:

1. A storage unit including a frame, means forming a vertically extending helical runway mounted on the frame, a vertical spindle mounted for rotation on the frame coaxially with the central vertical axis of the runway, means including a pair of vertically spaced rotatable members mounted on the spindle for rotation about spaced horizontal axes, an endless element extending around said pair of rotatable members, said endless element having a plurality of laterally extending arms thereon projecting into the space between successive convolutions of the runway, said arms being spaced apart along said endless element a distance corresponding to the pitch of the helical runway, each arm having a vertically projecting pusher element thereon which extends into the runway in a vertical direction, a helical guide member positioned adjacent and in parallel relation with the convolutions of the runway, means on said endless element engaging said guide member for moving the endless element around said pair of rotatable elements a distance corresponding to the pitch of the helix during each revolution of said spindle, and means for rotating said spindle whereby said vertically extending pusher elements are adapted to engage articles in the runway and convey the articles along the runway in response to rotation of said spindle.

2. A storage unit as called for in claim 1, wherein said pusher members have flexible article-engaging portions adapted to sweep past an article in the runway when movement of the article along the runway is obstructed.

3. A storage unit as called for in claim 1, wherein said guide member comprises a helically extending rail and said means on the endless element engaging the rail comprise rollers.

4. A storage unit as called for in claim 1, wherein said pusher elements extend downwardly from said arms toward the adjacent convolution of the helical runway.

5. A storage unit as called for in claim 1, wherein said helical runway is provided with a vertically extending slot therein, said pusher elements projecting upwardly from said arms through said slot and into the runway.

6. A storage unit as called for in claim 1, wherein said rotatable elements comprise sprockets and the endless element comprises a chain.

7. A storage unit as called for in claim 1, including a vertically extending back-up element mounted on said spindle adjacent said laterally extending arms for receiving the thrust of said arms due to the propelling action on the articles in the runway.

8. A storage unit as called for in claim 7, wherein said back-up element comprises a vertically extending rail and rollers mounted on said arms and engaging said back-up rail.

9. A storage unit as called for in claim 1, wherein said first-mentioned means includes a plurality of pairs of vertically spaced rotatable members mounted on the spindle and similar endless elements with said arms and pusher elements thereon provided for each pair of rotatable members.

10. A storage unit as called for in claim 1, including means forming an inlet chute connected with the lower extremity of said runway, said inlet chute extending generally tangentially of said lower extremity of the runway and having inner and outer side walls for restricting lateral movement of the article therein, the axis of rotation of the lower rotatable member lying in a horizontal plane adjacent said lower extremity of the runway, the inner wall of said inlet chute having a notch therein adjacent said lower extremity of the runway providing clearance for enabling said arms and the pusher elements thereon to swing upwardly around said lower rotatable member into the space between successive convolutions of the runway.

11. A storage unit as called for in claim 1, wherein said pusher elements comprise brushes having flexible bristles thereon.

12. A storage unit as called for in claim 1, including a helical guide rail extending parallel to the convolutions of the runway and a plurality of pairs of vertically spaced rollers on said endless element engaging vertically spaced edge portions of said guide rail to constrain movement of said arms in a helical path parallel to the runway.

13. A storage unit including a frame, means forming a vertically extending helical runway mounted on the frame, a vertical spindle mounted for rotation on the frame coaxially with the central vertical axis of the runway, means including a pair of vertically spaced rotatable members mounted on the spindle for rotation about spaced horizontal axes, said horizontal axes being spaced from the central vertical axis of the spindle, an endless element extending around said pair of rotatable members, said endless element having a plurality of laterally extending arms thereon which on the outer run of the endless element project into the space between successive convolutions of the runway, said arms being spaced apart along said endless element a distance corresponding to the pitch of the helical runway, each arm having a propelling element thereon for engaging a workpiece positioned on the runway, a helical guide member positioned adjacent and in parallel relation with the convolutions of the runway, follower means on said endless element engaging said guide member for moving the endless element around said pair of rotatable elements a distance corresponding to the pitch of the helix during each revolution of the spindle, and means for rotating said spindle whereby the propelling elements are adapted to engage articles in the runway and convey the articles along the runway in response to the rotation of the spindle, the disposition of said arms and the horizontal distance between the ends of the propelling elements on the opposite vertical runs of the endless element being such that the propelling elements on the inner vertical run of the endless element clear the spindle.

14. A storage unit as called for in claim 13, wherein the rotatable members are disposed such that the endless element travels in a vertical plane which is radial to the spindle, the propelling elements on the inner run of the endless element travelling in a vertical path spaced radially outward from the spindle in a direction toward the axes of the rotatable members.

15. A storage unit as called for in claim 13, including a vertically extending back-up element mounted on the spindle adjacent the path of travel of the outer run of the endless element, and means on said arms engaging said vertically extending back-up element for receiving the thrust of said arms due to the propelling action on the articles in the runway.

16. The combination called for in claim 15, wherein said guide member comprises a helical rail extending around the inside of the runway, said vertically extending back-up element comprising an upright rail, said means engaging the guide member, and the back-up member comprising brackets on said arms and at least two guide rollers on said brackets, one guide roller engaging the helical rail and the other guide roller engaging the vertical rail.

17. A storage unit as called for in claim 16, wherein said guide rail is fashioned with parallel upper and lower edges, said bracket having a guide roller thereon engaging the upper edge of the guide member and another guide roller thereon engaging the lower edge of the guide member.

References Cited by the Examiner
UNITED STATES PATENTS
3,071,240   1/1963   Graham _____ 198—171

EVON C. BLUNK, *Primary Examiner.*
R. E. AEGERTER, *Assistant Examiner.*